Patented Sept. 21, 1937

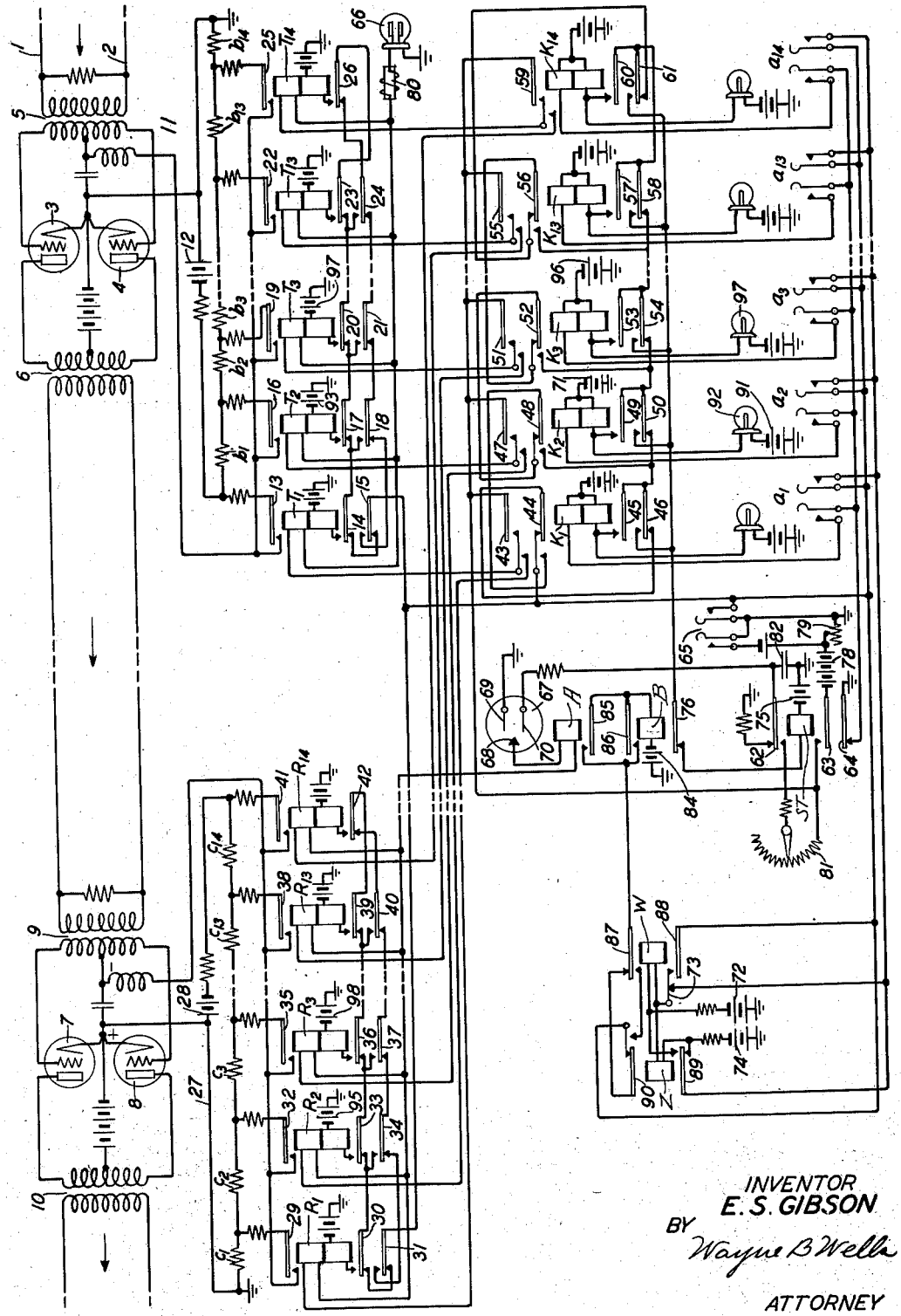

2,093,670

UNITED STATES PATENT OFFICE 2,093,670

CONTROL CIRCUITS

Earl S. Gibson, Ridgewood, N. J., assignor to Bell Telephone Laboratories, Incorporated, New York, N. Y., a corporation of New York Application August 9, 1935, Serial No. 35,414

12 Claims. (Cl. 178—44)

This invention relates to circuits for transmitting programs having a wide volume range and particularly to circuits for compressing the volume range at the transmitting end of a transmission line and for expanding the volume to the original range at the receiving end of the line.

One object of the invention is to provide a system that shall compress the volume range at the transmitting end of a line and after a controlled time delay shall expand the volume at the receiving end of the line to the original range.

Another object of the invention is to provide a system that under manual control shall compress the volume range at the transmitting end of a line and expand the volume to the original range at the receiving end of the line and that shall insure against change of the volume control at the transmitting and receiving ends of the line after one manual setting has been made until another manual setting of the volume is made.

A further object of the invention is to provide a system that under manual control shall compress the volume range at the transmitting end of a line and expand the volume to the original range at the receiving end of the line and that shall employ chains of relays which are interlocked to insure operation of only one relay of each chain at a time whereby change in the volume control at the transmitting and receiving ends of the line after one manual setting has been made is prevented until another manual setting of the volume is made.

The volume range of many programs, for example, orchestral programs, is too wide to be transmitted over telephone toll lines. The volume range which may be transmitted over a line has a lower limit by reason of interference from line noises and an upper limit to avoid overloading of line apparatus. In order to transmit programs of wide volume range it is necessary to compress the volume range to a volume within the upper and lower limits at the transmitting end of the line and to expand the volume to the original range at the receiving end of the line.

Telephone repeaters have a volume range of approximately 40 decibels. This range is satisfactory for the transmission of messages but is inadequate for the transmission of orchestral music where the volume range may be of the order of 80 decibels. Music is loud at one time and soft at another time so that the control of a volume compression and expansion circuit must change from time to time. If the output from the receiving end is to be a faithful reproduction of the input at the transmitting end, the compression and expansion of the volume must be complementary and changes in volume at the two ends of the line should be in synchronism. The transmitting and the receiving ends of the line may be widely separated so that the propagation time for transmitting a signal to the receiving end of the line will introduce some delay and thereby prevent exact synchronism.

In a volume compression and expansion system constructed in accordance with the present invention manually operated means at the transmitting end of a line is provided to control the gains of repeaters at the two ends of a toll line circuit. Because the repeaters at the two ends of a toll line cannot be controlled simultaneously due to the delay in propagating the control signals over the toll line, with a resultant impairment in the transmission, it is necessary to make tests to determine the delay that may be permitted over different lines.

In accordance with the present invention the compression and expansion of the volume will be obtained by changing the gain of variable mu tubes in the repeater circuit at the transmitting and receiving ends of a line. Two variable mu tubes connected in push-pull relationship are provided at the transmitting and receiving ends of the line. A potentiometer having a number of taps extending therefrom and controlled by a chain of transmitting relays is provided for carrying the negative bias on the variable mu tubes at the transmitting end of the line. A similar potentiometer is provided at the receiving end of the line under control of a chain of receiving relays to vary the negative bias on the grids of the variable mu tubes. The bias impressed on the tubes at the receiving end of the line is opposite in effect to the bias impressed on the tubes at the transmitting end of the line so that the volume of the signals at the receiving end of the line is expanded to the original range. Whatever compression is effected by the variable mu tubes at the transmitting end of the line is corrected by an equal expansion at the receiving end of the line. The taps from the potentiometer at the transmitting end of the line are equal in number to the taps from the potentiometer at the receiving end of the line and the relays in the chain of transmitting relays are equal in number to the relays in the chain of receiving relays.

A chain of locking relays equal in number to the transmitting relays or the receiving relays is provided at the transmitting end of the line for controlling both the transmitting and receiving relays. A manually operated non-locking key is associated with each of the locking relays and each locking relay is associated with one transmitting relay and one receiving relay.

Upon momentary operation of a manually operated non-locking key, the locking relay associated therewith is operated and a holding circuit therefor is completed through switch members of each of the other locking relays. The locking relay upon operation prepares a circuit not only for operating the associated transmitting relay but also for operating the associated receiving relay. The locking relay also completes a circuit for operating a starting relay. The starting relay completes a circuit for operating the selected transmitting relay and after a time delay which may be varied completes a circuit for operating the associated receiving relay. The time delay in operating the selected receiving relay is controlled by varying the charging rate of a condenser in the circuit of a three-element gas-filled cold electrode tube.

The transmitting relay upon operation establishes a holding circuit which includes a switch member of each of the other transmitting relays. The selected receiving relay upon operation establishes a holding circuit which includes a switch member of each of the other receiving relays. The selected transmitting relay connects a potentiometer tap to the grids of the variable mu tubes at the transmitting end of the line to effect the desired compression of the signals being transmitted over the line. The selected receiving relay at the receiving end of the line connects a potentiometer tap to the grids of the variable mu tubes at the receiving end of the line to effect expansion of the signal volume to the original range. The holding circuits for the locking relays are interlocked through switch members of each of the other associated relays in order that only one locking relay can be operated at a time. This feature also applies to the chain of transmitting relays and the chain of the receiving relays.

When it is desired to change the compression effect at the transmitting end of the line a second key is momentarily operated. Upon operation of the second key the locking relay associated therewith is operated. Operation of the second locking relay breaks the holding circuit of the first operated locking relay which releases. Operation of the second locking relay prepares circuits for operating the transmitting relay and the receiving relay associated therewith. The second locking relay then operates the starting relay for completing circuits to operate the receiving and transmitting relays associated with the second locking relay. The operation of the second transmitting relay releases the first transmitting relay and the operation of the second receiving relay releases the first operated receiving relay. The second operating transmitting relay changes the compression effected by the variable mu tubes at the transmitting end of the line and the second operating receiving relay effects a corresponding change in the expansion produced by the variable mu tubes at the receiving end of the line.

The single figure in the accompanying drawing is a diagrammatic view of a control circuit constructed in accordance with the invention.

Referring to the drawing, a transmission line having two input conductors 1 and 2 is connected to two variable mu tubes 3 and 4 by means of a transformer 5. The output circuits of the tubes 3 and 4 are connected to the line by means of an output transformer 6. At the receiving end of the transmission line two variable mu tubes 7 and 8 are connected in the line by means of an input transformer 9 and an output transformer 10. A potentiometer 11 is provided at the transmitting end of the transmission line for controlling the negative bias impressed on the grids of tubes 3 and 4. The potentiometer 11 which is connected across a suitable source of potential 12 is divided into sections $b1$ to $b14$, inclusive. Sections $b4$ to $b12$, inclusive, of the potentiometer have been omitted from the drawing to clarify the illustration. Transmitting relays T1 to T14, inclusive, are provided for connecting taps from the potentiometer 11 to the grids of tubes 3 and 4. Relays T4 to T12, inclusive, have been omitted from the drawing. Relays T4 to T12, inclusive, operate in a manner similar to the relays illustrated. The relay T1 is provided with three switch members 13, 14, and 15. The relay T2 is provided with three switch members 16, 17, and 18. The relay T3 is provided with three switch members 19, 20 and 21. Relay T13 is provided with three switch members 22, 23, and 24. The relay T14 is provided with only two switch members 25 and 26. Upon operation of the relay T1 the highest negative bias from the potentiometer 11 will be impressed on the grids of the tubes 3 and 4. Operation of the relays T2 to T14, inclusive, progressively reduces the negative bias on the grids of the tubes 3 and 4.

A potentiometer 27 which is connected across a source 28 is divided into sections C1 to C14, inclusive, for controlling the negative bias of the grids of the devices 7 and 8. In order to clarify the description and operation, potentiometer sections C4 to C12, inclusive, have been omitted from the drawing. Taps from the potentiometer 27 are connected to the grids of the tubes 7 and 8 by means of receiving relays R1 to R14, inclusive. Relays R4 to R12, inclusive, have been omitted from the drawing. Such relays are similar to the illustrated relays R1, R2, R3 and R13. The relay R1 is provided with three switch members 29, 30 and 31. The relay R2 is provided with switch members 32, 33 and 34. Relay R3 is provided with switch members 35, 36 and 37. Relay R13 is provided with switch members 38, 39 and 40. The relay R14 is provided with two switch members 41 and 42.

A chain of locking relays K1 to K14, inclusive, is provided for controlling the operation of transmitting relays T1 to T14, inclusive, and the receiving relays R1 to R14, inclusive. Locking relays K4 to K12, inclusive, have been omitted to clarify the illustration. The relays K4 to K12, inclusive, are similar to the other locking relays with the exception of the relay K14. The relay K1 is provided with switch members 43, 44, 45, and 46. Relay K2 is provided with switch members 47, 48, 49 and 50. The relay K3 is provided with switch members 51, 52, 53 and 54. The relay K13 is provided with switch members 55, 56, 57 and 58. The relay K14 is provided with switch members 59, 60 and 61.

A series of manually operated non-locking keys $a1$ to $a14$ inclusive, is provided for controlling the operation of the locking relays K1 to K14, inclusive. Keys $a4$ to $a12$, inclusive, have been omitted from the drawing. Keys $a4$ to $a12$, inclusive, are associated with the locking relays K4 to K12, inclusive, which have been omitted from the drawing. A starting relay ST having switch members 62, 63, and 64 is provided for completing circuits for operating the transmitting relays and the receiving relays. Key 65 is provided for effecting a ground circuit. A gas-filled space discharge device 66 having two cold electrodes is associated with the operating circuit for the transmitting relays. A gas-filled space discharge device 67 having three cold electrodes 68, 69, and 70 is provided in the energizing circuit for the receiving relays R1 to R14, inclusive. Two relays A and B are provided for opening the circuit of the starting relay ST upon operation of the receiving relays. Two relays Z and W are provided in the circuit of the keys a1 to a14, inclusive.

Assuming all relays to be in position shown on the drawing, the key 65 operated, and the key a2 operated for completing a circuit to energize the locking relay K2, the locking relay K2 is operated by a circuit extending from a battery 71 through the operating coil of the relay K2, key a2, switch member 64 of the starting relay ST in released position and ground return to the battery 71. The relay W is operated by a circuit extending from a grounded battery 72 through the coil of the relay W, switch member 73, key a2, key 65 and ground return to the battery 72. The relay Z is not energized at this time from a battery 74 because the coil of the relay Z is shunted by the key a2 and switch member 89. Upon release of the key a2 the relay Z is operated from the battery 74, through switch members 88 and 65.

The relay K2 upon operation completes a holding circuit including switch members of all the other locking relays. The holding circuit for the relay K2 may be traced from the battery 71 through the coil of the relay K2, switch member 49, switch member 54 of the relay K3, switch member 58 of the relay K13, switch member 61 of the relay K14, switch member 56 of the relay K13, switch member 52 of the relay K3, switch member 46 of the relay K1, switch member 44 of the relay K1, key 65 and ground return to the battery 71. In the circuit above traced, it will be noted that a switch member of each of the other released locking relays is included. It is thus impossible to lock more than one locking relay at a time. The circuit through the omitted locking relays is similar to the circuit shown on the drawing.

The locking relay K2 also completes a circuit from a battery 75 for operating the starting relay ST. The circuit for operating the starting relay may be traced from the battery 75 through the energizing coil of the starting relay ST, switch member 76 of the relay B, switch member 50 of the relay K2, switch members 54, 58, 61, 56, 52, 46 and 44 of the locking relays, key 65 and ground return to the battery 75. The switch member 47 of the relay K2 upon operation partially completes circuits for operating the transmitting relay T2 and the receving relay R2.

A circuit is completed from a battery 78 by the starting relay ST for effecting operation of the transmitting relay T2 without any delay. The circuit for operating the relay T2 may be traced from ground through an adjustable resistance 79, battery 78, switch member 63 of the starting relay ST, switch member 47 of the relay K2, energizing coil of the relay T2, inductance 80, space discharge device 66 and ground return to the battery 78. The relay T2 upon operation connects a tap from the potentiometer 11 to the grids of tubes 3 and 4 to effect a predetermined compression in the volume range of the signals. This operation will be described later.

The starting relay ST also completes a circuit from the battery 78 for breaking down the three element space discharge device 67. The circuit for the device 67 extends from the grounded battery 78 through the switch member 63 of the starting relay, adjustable resistance 81, switch member 62 of the starting relay ST, electrodes 70 and 69 of the device 67 and ground return to the battery 78. A condenser 82 which is shunted by the adjustable resistance 81 is provided for effecting a delay in the breakdown of the tube 67. The resistance 81 is adjustable in order to vary the time of breakdown of the tube by controlling the charging rate of condenser 82. Upon breakdown of the device 67 a circuit is completed for operating the receiving relay R2 and also relay A. The circuit for operating the relays R2 and A may be traced from ground through the electrodes 69 and 68 of the device 67, coil of the relay A, coil of the relay R2, switch member 47 of the relay K2, switch member 63 of the starting relay ST and grounded battery 78. The relay R2 in a manner to be described later, connects a tap from the potentiometer 27 to the grids of the tubes 7 and 8 to effect an expansion of the range of signals on the line.

The relay A, upon operation, completes a circuit from a battery 84 for operating relay B. The circuit for operating the relay B extends from grounded battery 84 through the coil of relay B, switch member 85 of the relay A, switch member 87 of a relay W in operated position, switch member of relay Z in operated position, key 65 and ground return to the battery 84. The switch member 86 operated by the relay B establishes a holding circuit so that the relay B is not released upon release of the relay A. Switch member 76 operated by the relay B opens the circuit of the starting relay ST and permits the release of this relay. The starting relay ST on release removes battery from the condenser 82 and permits discharge of the condenser. Release of the starting relay ST also deionizes the tubes 67 and 66, releases relay A, and opens the energizing circuit through the relays T2 and R2.

The locking relay K2 upon operation completes a circuit from a battery 91 to light a lamp 92 in order to indicate that this relay is in operated position. The transmitting relay T2 upon operation completes a holding circuit from a battery 93. The switch member 16 operated by the relay T2 connects a tap from the potentiometer 11 to the grids of the tubes 3 and 4 for impressing a predetermined negative bias on the grids. This negative bias impressed on the grids of the variable mu tubes 3 and 4 serves to compress the volume range of the signals a desired amount.

The receiving relay R2 upon operation establishes a holding circuit from a battery 95. The holding circuit for the relay R2 may be traced from the grounded battery 95 through the holding coil of the relay R2, switch member 33 of the relay R2, switch member 36 of the relay R3, switch member 39 of the relay R13, switch member 42 of the relay R14, switch member 40 of the relay R13, switch member 37 of the relay R3, switch member 34 of the relay R2, switch members 30 and 31, of the relay R1, key 65 and ground return to the battery 95. The relay R2 upon operation connects a tap from the potentiometer 27 to the grids of the variable mu tubes 7 and 8 by means of the switch member 32. The relay R2 so changes the potential on the variable mu tubes 7 and 8 as to effect an opposite change in the volume of the signals to that which is effected by the relay T2 at the transmitting end of the line. The signals are thus restored to their original volume range. The relays R4 to R12, inclusive, in the chain of receiving relays which have been omitted from the drawing operate in a similar manner to the relays R1, R2 and R3. At the transmitting end of the line the relays T4 to T12, inclusive, perform a function exactly similar to the relays T1 to T3, inclusive. At this time the lamp 92 is lighted and relays K2, T2, R2, B, W, and Z are operated.

When it is desired to reduce the compression at the transmitting end of the line one step, the key a3 is operated momentarily. Operation of the key a3 establishes a shunt around the coil of the relay W so that this relay releases. The release of relay W in turn releases relay B. A circuit is completed for operating the locking relay K3 from a battery 96. The circuit for operating the relay K3 extends from the battery 96 through the coil of the relay K3, key a3, switch member 64 of the starting relay ST and ground return to battery 96. When the key a3 is released, a shunt is effected around the coil of the relay Z to effect release of this relay. The relay K3 upon operation opens the holding circuit for the relay K2 by means of the switch member 54. The switch member 53 of relay K3 not only completes a circuit for lighting the lamp 97 but also completes a locking circuit from the battery 96 through switch members of each of the other locking relays. The locking circuit is believed to be self-evident in view of the other locking circuits which have been traced.

The switch member 51 operated by the relay K3 prepares circuits for operating the transmitting relay T3 and receiving relay R3. The switch member 54 operated by the relay K3 completes a circuit from the battery 75 for operating the starting relay ST. The starting relay upon operation completes a circuit from the battery 78 for operating the relay T3. This circuit is completed through the discharge device 66 as above described in tracing the energizing circuit for relay T2. The relay T3 upon operation releases the relay T2 and establishes a holding circuit for itself from a battery 97. The relay T3 upon operation connects another tap from the potentiometer 11 to the grids of the tubes 3 and 4 by means of the switch member 19. The negative bias on the grids is reduced so as to reduce the compression effected in a range of signals.

The staring relay ST also breaks down the tube 67 by a circuit including the condenser 82. The condenser 82 in combination with the resistance 81 insures a delay in the operation of the device 67. Upon breakdown of the device 67 a circuit is completed from the battery 78 for energizing relay R3. The circuit through the relay R3 is similar to the circuit above traced through the relay R2. The relay R3 upon operation completes a holding circuit from a battery 98. The switch member 35 operated by the relay R3 connects a tap from the potentiometer 27 to the grids of tubes 7 and 8 to expand the range of the signals to their original range before compression by the variable mu tubes 3 and 4. The relay R3 also upon operation insures the release of a relay R2. The relay A is operated upon breakdown of the device 67. Relay A operates ths relay B which in turn releases the starting relay ST. The starting relay opens the operating circuits for relays T3 and R3.

The transmitting relays T1 to T14, inclusive, may be controlled by the keys a1 to a14, inclusive, and the locking relays K1 to K14, inclusive, to effect any desired compression of the signal range on the transmission line. At the same time the receiving relays R1 to R14, inclusive, are operated to restore the range of the signals to the original range before compression by the variable mu tubes 3 and 4. For testing purposes it is desirable to vary the time of operation of the receiving relays R1 to R14, inclusive, with respect to the transmitting relays T1 to T14, inclusive. A predetermined delay in the operation of the relays R1 to R14, inclusive, is effected by varying the resistance 81 which controls the charging time of condenser 82 and accordingly the delay in the breakdown of the device 67 which controls the operation of the receiving relays.

Modifications in the circuit and in the arrangement and locations of parts may be made in the spirit and scope of the invention and such modifications are intended to be covered by the appended claims.

What is claimed is:

1. In a volume compression and expansion system, a transmission line having a transmitting station and a receiving station, an amplifier space discharge device at each of said stations, means controlled at the transmitting station for varying the potential on the control grid of the device at the transmitting station and for oppositely varying the potential on the control grid of the device at the receiving station and adjustable means located at the transmitting station for effecting a variable time delay in the operation of the device at the receiving station with respect to the operation of the device at the transmitting station.

2. In a volume compression and expansion system, a transmission line having a transmitting station and a receiving station, an amplifier space discharge device at each of said stations, a plurality of locking relays at the transmitting station having switch members, means for operating any one of said relays and for locking the operated relay through switch members controlled by the other relays in released position, and means controlled by said relays for varying the potential on the control grid of the device at the transmitting station and for oppositely varying the potential on the control grid of the device at the receiving station.

3. In a volume compression and expansion system, a transmission line having a transmitting station and a receiving station, an amplifier space discharge device at each of said stations, a plurality of locking relays at the transmitting station, means comprising a plurality of keys corresponding in number to the locking relays for respectively operating the locking relays, means upon operation of one of said keys for locking the operated relay through switch members controlled by the other relays in released position, means controlled by said relays for varying the potential on the control grid of the device at the transmitting station and for oppositely varying the potential on the control grid of the device at the receiving station, and means comprising said switch members for releasing the locked relay upon operation of another key.

4. In a volume compression and expansion system, a transmission line having a transmitting station and a receiving station, a plurality of locking relays at the transmitting station, means for operating any one of said relays and for locking the operated relay through switch members controlled by each of the other relays in released position, volume control means at each of said stations, and means controlled by said relays for operating the volume control means at the transmitting station to compress the signal volume and for operating the volume control means at the receiving station to expand the signal volume an amount corresponding to the compression at the transmitting station.

5. In a volume compression expansion system, a transmission line having a transmitting station and a receiving station, a plurality of locking relays at the transmitting station, means for operating any one of said relays and for locking the operated relay through switch members controlled by each of the other released relays, volume control means at each of said stations, and means controlled by said relays for operating the volume control means at the transmitting station to compress the signal volume and after a predetermined time delay for operating the volume control means at the receiving station to expand the signal volume to the original range.

6. In a control circuit, a plurality of relays each having a plurality of switch members operated thereby, an operating coil and a holding coil for each of said relays, means for energizing any one of said operating coils, and means upon operation of any one of said relays for energizing the associated holding coil and for interlocking the circuit of the energized holding coil through a switch member of each of the other relays to insure locking of only one relay at one time.

7. In a control circuit, a plurality of relays each having an operating coil, a holding coil and a plurality of switch members, means for energizing any one of said operating coils to operate a relay and means upon operating of any operating coil for completing an energizing circuit for the associated holding coil through a switch member of each of the other relays.

8. In a control circuit, a chain of relays each having an operating coil, a holding coil and a plurality of switch members, means for energizing any one of said operating coils to operate the associated switch members and means including the switch members of any operated relay for completing an energizing circuit for the holding coil of the operated relay through switch members of the other relays in released position.

9. In a volume compression and expansion system, a transmission line having a transmitting station and a receiving station, volume control means at each of said stations, means comprising a plurality of transmitting relays each controlling the volume control means at the transmitting station, means comprising a plurality of receiving relays each controlling the volume control means at the receiving station, a plurality of locking relays at the transmitting station, means for operating any one of said locking relays and for locking the operated relay through switch members controlled by the other released locking relays, and means controlled by the operated locking relay for operating one of said transmitting relays to compress the signal volume at the transmitting station and for operating one of said receiving relays after a time delay to expand the signal volume to the original range.

10. In a volume compression and expansion system, a transmission line having a transmitting station and a receiving station, volume control means at each of said stations, means comprising a plurality of transmitting relays each controlling the volume control means at the transmitting station by different amounts, an operating coil, a holding coil and a plurality of switch members for each of said transmitting relays, means, upon operation of one of said relays, for energizing the associated holding coil and for interlocking the circuit of the energized holding coil through a switch member of each of the other transmitting relays, means comprising a plurality of receiving relays each controlling the volume control means at the receiving station, an operating coil, a holding coil and a plurality of switch members for each of said receiving relays, means upon operation of one of said receiving relays for energizing the associated holding coil through a switch member of each of the other receiving relays, and means for operating a transmitting relay to compress the volume range and for operating a receiving relay to expand the volume to the original range.

11. In a volume compression and expansion test circuit, a transmission line having an amplifier space discharge device at a transmitting station and an amplifier space discharge device at a receiving station, a potentiometer at the transmitting station divided into sections by taps, a potentiometer at the receiving station divided into sections by taps, transmitting relays for respectively connecting the taps of the transmitting potentiometer to the grid of the transmitting amplifier, receiving relays for respectively connecting the taps of the receiving potentiometer to the grid of the receiving amplifier, a plurality of locking relays each having a plurality of switch members, means for operating one of said locking relays and for establishing a holding circuit therefor through switch members of each of the other locking relays, and means governed by the operated locking relay for operating a corresponding transmitting relay to connect the potentiometer tap associated therewith to the grid of the transmitting device and for operating the corresponding receiving relay after a variable time delay to connect the potentiometer tap associated therewith to the grid of the receiving device.

12. In a volume compression and expansion system, a transmission line having an amplifier space discharge device at a transmitting station and an amplifier space discharge device at a receiving station, a potentiometer at the transmitting station having taps extending therefrom, a potentiometer at the receiving station having taps extending therefrom, transmitting relays for respectively connecting the taps of the transmitting potentiometer to the grid of the transmitting device, receiving relays corresponding in number to the transmitting relays for respectively connecting the taps of the receiving potentiometer to the grid of the receiving device, a plurality of keys corresponding in number to the transmitting relays, and means upon operation of any one of said keys for effecting operation of corresponding transmitting and receiving relays, a holding circuit for each of the transmitting relays interlocked through each of the other transmitting relays and a holding circuit for each of the receiving relays interlocked through the other receiving relays.

EARL S. GIBSON.